United States Patent [19]

Kageyama et al.

[11] 4,275,814
[45] Jun. 30, 1981

[54] FILM CONTAINING MAGAZINE

[75] Inventors: Hiroshi Kageyama, Utsunomiya; Tsuyoshi Saito, Otawara, both of Japan

[73] Assignee: Tokyo Shibaura Denki Kabushiki Kaisha, Japan

[21] Appl. No.: 68,007

[22] Filed: Aug. 20, 1979

[30] Foreign Application Priority Data

Aug. 25, 1978 [JP] Japan .................. 53-103700

[51] Int. Cl.³ .................. G03B 41/16; A61B 6/00; B65H 3/00; B65D 85/30
[52] U.S. Cl. .................. 206/455; 312/50
[58] Field of Search .......... 206/455, 449, 557, 820; 312/50; 221/308; 229/17 S

[56] References Cited

U.S. PATENT DOCUMENTS

| Re. 27,297 | 2/1972 | Johnson et al. | 221/308 |
| 1,058,787 | 4/1913 | Nias | 221/308 |
| 2,816,376 | 12/1957 | Hirvonen | 206/557 |
| 3,051,584 | 8/1962 | Tindall | 206/820 |

FOREIGN PATENT DOCUMENTS 53-31741 8/1978 Japan .

Primary Examiner—William T. Dixson, Jr.
Attorney, Agent, or Firm—Finnegan, Henderson, Farabow, Garrett & Dunner

[57] ABSTRACT

A parallelepiped film containing magazine for containing a number of film sheets in stacked state is disclosed. In the magazine, a supporting plate is disposed in that portion of a magazine casing corresponding to an opening through which the films are taken in and out. A number of short furs as engaging elements for engaging with one end edge of each of the stacked films contained are planted on the wall of the supporting plate facing the one end edge of the films, being obliquely directed toward the bottom plate. A depression is formed in the inner wall of the top plate so as not to contact with the sheet film.

12 Claims, 7 Drawing Figures

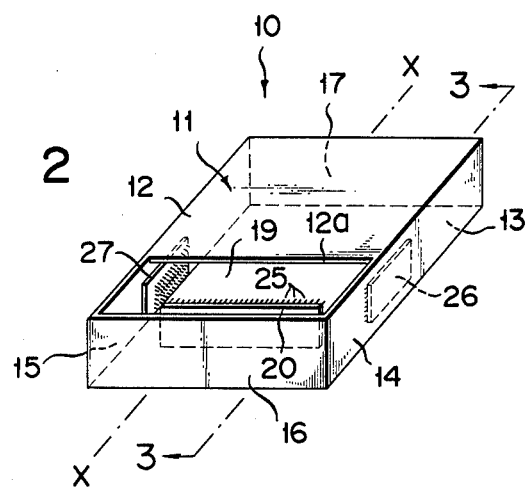
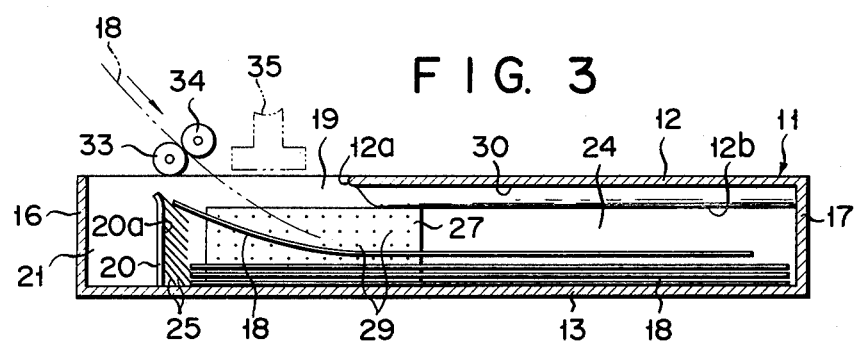
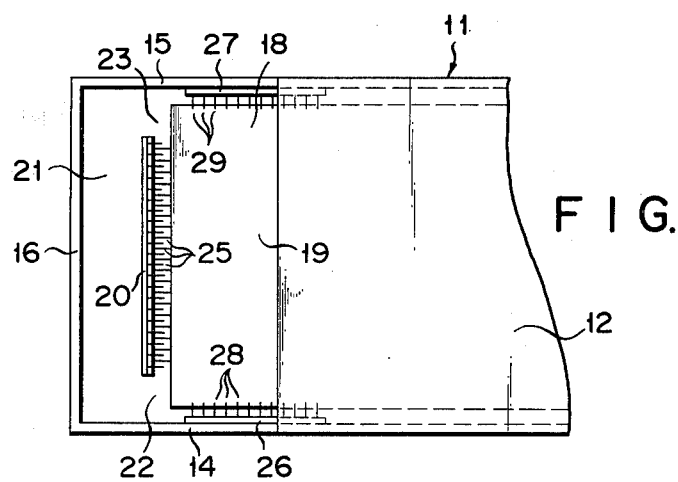

FILM CONTAINING MAGAZINE

BACKGROUND OF THE INVENTION

This invention relates to an improvement over a film containing magazine used in an X-ray photographing machine, such a maganize containing in a stack from which the sheet films are taken out sheet by sheet for use.

In an X-ray photographing machine of this kind, an unexposed sheet film is moved by its film carrier to the X-ray exposure position at the time of X-ray photographing or X-ray radioscoping observation. The operator of the machine takes X-ray photographs as required apropos while he observes the X-ray radioscoping image of the affected part of an examinee with an X-ray radioscoping apparatus including an X-ray television. After completion of photographing, the exposed sheet film is moved by the film carrier into an exposed film magazine for storage.

FIG. 1 shows an example of the prior art of such an X-ray photographing machine. Firstly, this will be explained briefly relating to the background causing the invention.

In the figure, a designates a movable frame of the machine; b a support frame to bear or support the movable frame a; c a table top on which an examinee d lies; e an X-ray source; f an image intensifier device mounted on the movable frame and disposed on the other side of the examinee d facing the X-ray source e.

The movable frame a, together with the support frame b, can rotate about the examinee d in the arrow g direction and also is slidable in the direction longitudinal to the examinee d (perpendicular to the surface of the drawing or this paper). Additionally, the movable frame b independently of the support frame can get closer to or farther from the examinee d, upward and downward in the arrow h direction.

In the movable frame a, a linear path j is defined for a film carrier i. The film carrier is normally in a stand-by position l. Each of an unexposed sheet films p in a supply magazine m is taken out one at a time by the vacuum sucker q and sent into the carrier i through paired rolls r. When it returns to the stand-by position l and goes through the paired rolls r and a guide path s to be collected in a takeup magazine m. A changeover plate t switches between forward feed and reverse feed of the films.

With this kind of machine designed to make possible X-ray photographing of the examinee d in any posture and in any desired direction by rotating the table top c, moving the movable frame a alone or together with the support frame b, rotationally or longitudinally, the following problem has been encountered as the frames a and b rotating the supply and takeup magazines m and n are brought to various positions and in some cases their openings u and v are held downward when the X-ray photograph is taken. The sheet films p in the magazines are relocated to have some of them come outward to block the opening so that the film taken out or brought in is sometimes hindered in its motion. Moreover, the films are scraped each other when relocated in the magazines, causing fine scratches on them and producing a spark due to the static electricity which causes a possible sensitization of the film. Therefore, the results could lead to an incorrect diagnosis because they adversely affect the image on the film to be observed. In addition, the undesirable displacement of films in the magazines could cause a local undue pressure on them, resulting in an increase in the extent of "blacking" to hinder clear X-ray exposure. Especially, the film takeup magazine n when receiving exposed films through its opening v is generally preferred to be considerably larger than that of the films. This makes the films flow into the magazine smoothly but causes a big problem on unstable position of the films in the magazine.

SUMMARY OF THE INVENTION

Accordingly, an object of the invention is to provide a film containing magazine of such an improved structure that the above-mentioned irregular position of the films in the magazine and protrusion of the films beyond its opening are prevented so as to provide always smooth flow of films in and out of the magazine, with being free from any angular position of the magazine, thereby eliminating undesirable formation of scratches on the film surface and sensitization of the film by a spark due to the static electricity, and sensitization or desensitization of the film due to unexpectable abnormal stress on the film.

The invention achieves the above object in the following manner. A number of engaging elements are mounted as projections on the front wall to partially define the film containing space so that they can engage with one of the edges of the film stack, the engaging elements being so arranged that those are directed obliquely toward its bottom wall.

With this arrangement, sheet films are fed into the magazine through the opening smoothly without being affected by the engaging elements. When the films once are placed in the magazine, they are not allowed to move irregularly from each other inside the magazine or to protrude through the opening because the edges of the films are caught by the engaging elements. If necessary, such engaging elements may be attached to the side walls and other walls as well. This secures a stable positioning of sheet films in the magazine effectively.

The invention further proposes that a depression be provided on the inner surface of the top wall to make sure that films are taken smoothly. The depression extends along the longitudinal axis of the magazine to its opening so that the area of the depression is larger enough to avoid direct contact of the sheet film with the top wall. Thus, the sheet film does not entirely touch the inner surface of the top wall even if the magazine is held upside down with its opening facing downward, but only the two narrow band portions along the sides are in contact with the inner surface of the top wall. Therefore, the friction between the film surface and the wall surface when the film is pulled out is reduced to allow smooth take-out of the film. This also eliminates the worry about undesirable scratches on the important central part of the films that could be created when the film is pulled out.

BRIEF DESCRIPTION OF THE DRAWINGS

FIG. 2 shows a perspective view of a film containing magazine according to the invention;

FIG. 3 shows an enlarged cross sectional view taken along line 3—3 in FIG. 2, with a film passage opening facing upward;

FIG. 4 shows in cross sectional form a top view of a part of the magazine shown in FIG. 1;

In connection with the accompanying drawings, directions such as "right" and "upward" refer to the invention as viewed in the respective drawings.

DESCRIPTION OF THE PREFERRED EMBODIMENT

A preferred embodiment according to the invention will be described in detail with reference to FIGS. 2 to 7.

Figure 1:
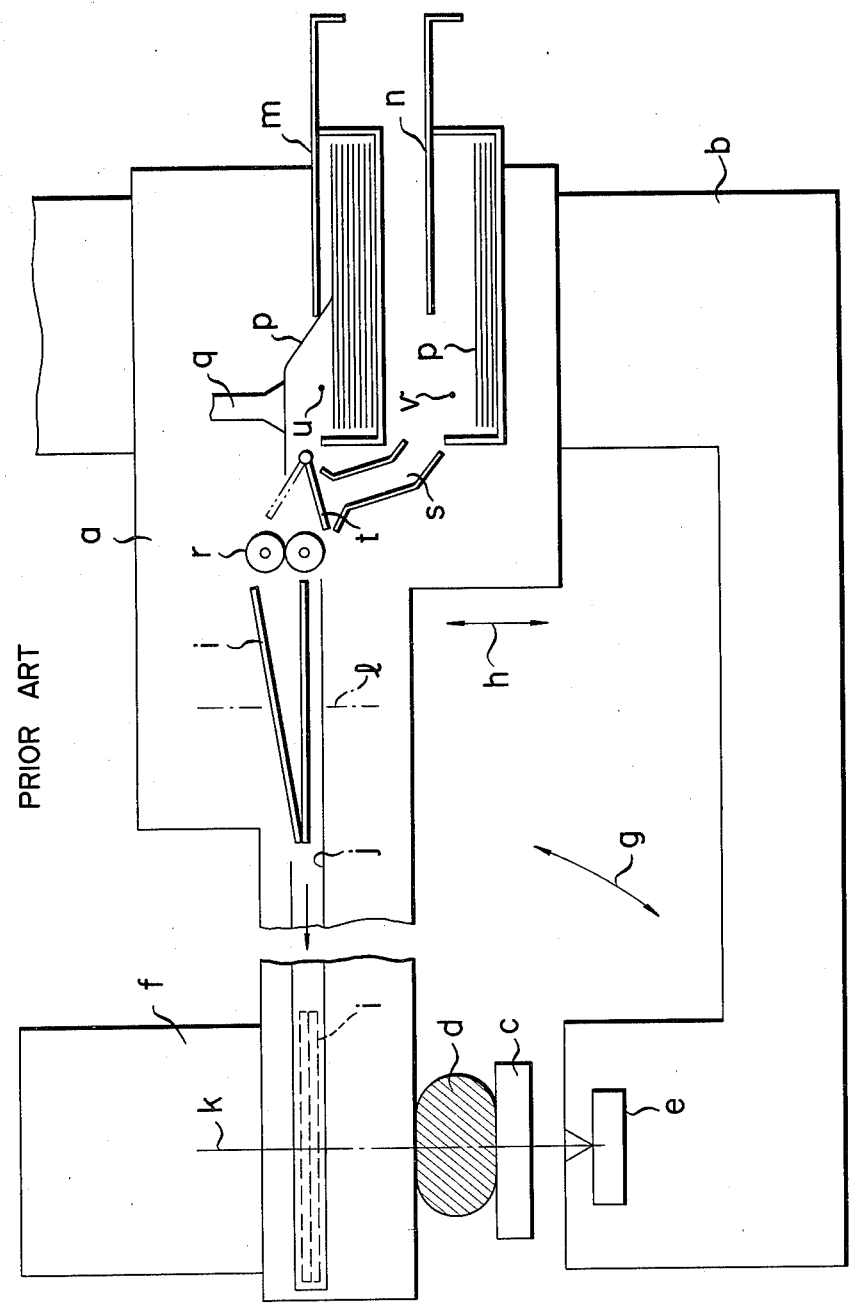
FIG. 1 shows a schematic representation of an X-ray photographing machine of the prior art.

A film containing magazine 10 according to the invention, perspectively illustrated in FIG. 2, is preferably used in the X-ray photographing machine as shown in FIG. 1. The magazine 10 may be used as or applied for either a supply magazine for containing unexposed sheet films or a takeup magazine for exposed sheet films. With its use for application depending on the mechanism of the machine used, the description to follow proceeds relating to only the structure of the magazine, not referring to the specific use or application of it.

In FIG. 2, the line X—X is assumed to be the longitudinal axis of the film containing magazine 10. The magazine 10 comprises a magazine casing 11 having top and bottom plates 12 and 13 and a pair of side plates 14 and 15, those being arranged along the longitudinal axis X—X and front and back plates 16 and 17 arranged crosswise of the longitudinal axis X—X.

On the top plate 12 side closer to the front plate 16, a square opening or slot 19 for taking the sheet films 18 into or out from the magazine casing 11 is disposed, and defined by the top edges of the front plate 16 and paired side plates 14 and 15 and the end edge 12a of the top plate 12.

Disposed in the area of the opening 19 is a support plate 20 the lower end of which is secured onto the inner wall of the bottom plate 13, with its separation from the front plate 16 to form a space 21, as illustrated in FIG. 3. FIG. 3 also illustrates a slight curvature of the top portion of the support plate 20 toward the front plate 16. As shown in FIG. 4, the length of the support plate 20 is shorter than the distance between paired side plates 14 and 15 to form side spaces 22 and 23 between the side edges of the support plate 20 and the inner walls of the corresponding side plates 14 and 15. The side spaces 22 and 23 have such sizes as to allow an operator (not shown) to insert his fingers therethrough for taking out the sheet film from the casing 11, as will be given later in detail.

As shown in FIGS. 2 and 3, a space 24 provided for collecting the sheet films 18 is defined at the rear side by the inner walls of the top and bottom plates 12 and 13 and the paired side plates 14 and 15 and at the front side by the wall 20a of the plate 20 facing the one end of the sheet film 18 to be collected.

As shown in FIG. 3, from the entire wall 20a of the support plate 20 a number of engaging elements 25 are projected, and made of a number of uniformly short-cut resilient fiber wires such as resin fine wires or seal's fur, thus taking an appearance of a brush as a whole.

As shown in FIG. 3, the engaging elements 25 are inclined with respect to the wall 20a, being directed downwardly or toward the bottom plate 13.

Support plates 26 and 27 like the support plate 20 with the engaging elements 25 are fixed to the inner walls of the respective side plates 14 and 15 on the area of the opening 19, namely on the side close to the support plate 20.

Figure 6:
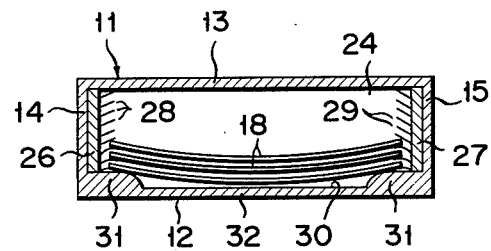
FIG. 6 shows a cross sectional view taken along line 6—6 in FIG. 5.

Engaging elements 28 and 29 also project from the entire surface of the inner walls of the support plates 26 and 27, inclining toward the bottom plate 13 with respect to the inner walls of the support plates 26 and 27, as well illustrated in FIG. 6.

Figure 5:
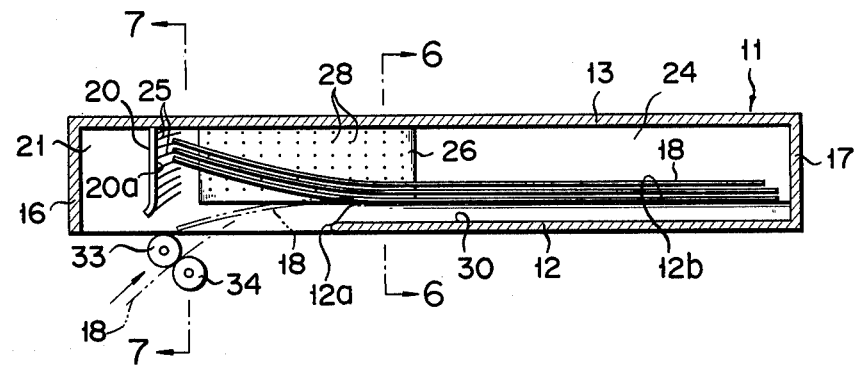
FIG. 5 shows an enlarged cross sectional view taken long line 3—3 in FIG. 2, with a film passage opening facing downward.

As shown in FIG. 6, the top plate 12 has at the inner wall 12b a wide depression 30 extending along the line X—X, with one end extending up to the opening 19 or the end edge 12a of the top plate 12. Because of the formation of the depression 30 in the inner wall 12b of the top plate 12, the inner wall has in cross section a step-like portions with thick, higher sections or lands 31 on both sides near the side plates 14 and 15 and a thin, lower section 32. Each higher section 31 has a narrow and flat film contact surface of which one longer side is connected to the corresponding side plate while the other side of each higher section 31 connected to the lower section 32, having a slightly rounded corner edge. As best illustrated in FIGS. 3 and 5, the end edge 12a of the top plate 12 is rounded to have a smooth surface, together with the higher and lower sections 31 and 32.

Explanation to follow is how the sheet film is taken into and out from the magazine 10. Assume now that the magazine 10 is placed in its opening facing upward, that is to say, in a normal state. On this assumption, the sheet film 18 is fed as shown by a chain line into the magazine 10 through paired feed rolls 33 and 34 and the opening 19 in the arrow direction. At this time, the engaging elements 25 little hinders the feeding of the sheet film, because the engaging elements incline toward the bottom plate 13 downwardly. Even when the leading end of the moving sheet film 18 hits the engaging elements 25, it slips down with little friction in most case.

There is a case, though it is rare, where the leading end of the travelling sheet film 18 gets caught on the engaging elements 25, as shown in FIG. 2. To avoid such a trouble and ensure a reliable feeding of the sheet film, a pusher 35 as indicated by a dotted line in FIG. 3 may be provided above the opening 19, movable in the arrow direction for pushing the sheet film caught into the collecting position in the magazine 10. However, such a case using the pusher 35 rarely occurs in actuality.

In taking out the sheet films sheet by sheet from the stacked ones in the magazine through the opening, a vacuum sucker (not shown) for example, forcibly attracts the sheet film and enters it between the rolls 33 and 34 for transportation. At this time, even if one end edge engages with the engaging elements 25, 28 or 29, the attraction by vacuum suction overcomes the engaging force thereby to bend the resilient engaging elements, resulting in no hindrance for the transportation of the sheet film.

Explanation will be given of a case where a bundle of sheet films collected in the magazine are taken out manually by an operator together. In this case, the operator can easily pull up one of the edges of the stacked sheet films to take them out together through the opening 19 by inserting his fingers into the side spaces 22 and 23 to reach the edges of the stacked sheet films as shown in FIG. 4.

As described above, the magazine casing 11 is provided with spaces 21, 22 and 23 specially defined for the operator to insert his fingers for taking films out, thereby making an easy take-out of the stacked sheet films.

On the other hand, it is troublesome to take films out of the casing of the conventional magazine because it does not have such special spaces obviously.

In the embodiment the support plate 20 is fixed on the inner wall of the bottom plate 13. However, also conceivable is a structure allowing the support plate 20 to slide. In other words, the support plate 20 is so designed that it can horizontally slide along the surface of the bottom plate 13 in the magazine casing 11 with reference to FIG. 3. Thus, there will be an ample space between the edges of the film stack and the support plate 20 when the support plate 20 is moved up to the front plate 16 and the operator can easily take films out.

Accordingly, the scope of this invention is not limited to the above-mentioned embodiment.

Figure 7:
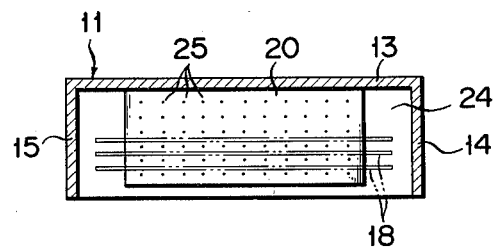
FIG. 7 shows a cross sectional view taken along line 7—7 in FIG. 5.

How to take out and feed in sheet films when the magazine 10 is positioned with the opening 19 facing downward, will be described with reference to FIGS. 5 to 7. The paired feed rolls 33 and 34 do the same thing as shown in FIG. 4. However, the stacked sheet films 18 rest on the inner wall 12b of the top plate 12 in the magazine casing 11. For this, in the conventional magazine, the stacked sheet films hang down at the one ends in the opening 19 as indicated by a chain line in FIG. 5 thereby to block the opening 19. Therefore, when a new sheet film 18 is fed in through the paired rolls 33 and 34 as shown by the two-dot chain line in the arrow direction, the sheet films hanging down as shown above might hinder the travel of the incoming film and sometimes it can not properly or smoothly go into the casing 11.

Further, in the conventional magazine with films stacked on the top plate of the inner wall, the lowermost film of the film stack is entirely intimately in touch with the top plate. That is, the weight of the film stack exerts fully on the lowermost one and causes a great frichtion to prohibit smooth take-out of the film and to create scratches on the film when it is pulled out. Particularly, such scratches in the central important part of the film are undesirable because they could make a great trouble in the X-ray diagnosis.

According to the invention, when the magazine is placed upside down, the leading edges of the stacked films 18 are caught by the engaging elements 25, thereby to prevent them from hanging down at one ends in the opening 19 to block the opening 19. As described above, the engaging elements 25 are in an oblique direction toward the bottom plate 13 as shown in FIG. 5, so that they retain the edge of the films well in engagement with them, although they are elastic. Evidently, the engaging elements 28 and 29 on the side walls perform the same function.

In addition, the depression 30 formed in the inner wall 12b of the top plate 12 prevents the stacked films from touching the lower section of the inner wall 12b, and the stacked films which rest on the higher section 31 near the side walls remain untouched over the depression 30 even though they bend slightly as shown in FIG. 6.

Since the stacked films are located as described above, the friction is remarkably reduced to permit smooth take-out of films, and, moreover, the important central part of the film is not scratched because it is not in contact with the surface of the inner wall of the top plate. Besides, the rounded edges of the higher section 31 are effective in preventing film surface scratches and permit smooth take-out films. By rounding the edge 12a of the higher and lower sections 31 and 32 delineating part of the opening 19 as shown in FIG. 5, the same effect as the above is obtained.

The magazine shown in the embodiment according to the invention does not have a cover member to close the opening. But the idea to provide the magazine casing of the design shown in the above drawings with a sliding cover member which can close the opening is obvious to the skilled person in the field. The provision of the cover member, however, is not essential to the invention.

What we claim is:

1. An elongated flat film containing magazine for containing a stack of sheet films used for an X-ray photographing machine which includes a frame on which said magazine is supported and tiltable to orient said magazine in various positions including upright horizontal, titled, and reversed or upside-down horizontal positions, said magazine comprising:
   (a) top, bottom and side walls extending along a longitudinal axis of the magazine, and front and back walls disposed crosswise of the longitudinal axis of the magazine, said walls defining a space for containing a number of films;
   (b) an opening formed in said top wall close to said front wall through which sheet films pass;
   (c) a plurality of flexible film engaging elements in said magazine directed toward said bottom wall and inclined with respect to said front wall facing one of the edges of the sheet films contained in said magazine so as to allow said engaging elements to engage said film edge; and
   (d) a wide depression formed along the longitudinal axis of said magazine on the inner surface of said top wall to said opening and facing the sheet films contained in said magazine, said depression minimizing engagement between the sheet films and said top wall when said magazine is in said upside-down horizontal position.

2. A film containing magazine according to claim 1, in which said engaging elements are uniformly short-cut fiber wires, having an appearance of a brush.

3. A film containing magazine according to claim 1 or 2, in which a number of engaging elements, directed toward said bottom wall and inclined with respect to said side walls, are arranged on that side of said side walls facing the corresponding side edges of the films contained.

4. A film containing magazine according to claim 3, in which said engaging elements arranged on said side walls are provided over a given area of said side walls only near said top wall.

5. A film containing magazine according to claim 1, in which the inner surface of said top wall facing the sheet films contained in said magazine includes higher surface sections nearer said side walls along the longitudinal axis and a lower surface section between said higher surface sections and forming, with said higher surface sections, stepped portions and said depression, whereby the sheet films contained contact at said higher surface sections and do not contact said lower surface sections when said magazine is in said upside-down horizontal position.

6. A film containing magazine according to claim 5, the edges of said higher surface section along said longitudinal axis being rounded.

7. A film containing magazine according to claim 5, in which each of said higher surface sections has a rounded end edge extending across the longitudinal axis of the magazine, said rounded end edge defining part of said opening.

8. A film containing magazine for containing a stack of sheet film used for an X-ray photographing machine which includes a frame on which said magazine is supported and tiltable to orient said magazine in various positions including upright horizontal, tilted, and reversed or upside-down horizontal positions, said magazine comprising:
 (a) a parallelpiped magazine casing having spaced top and bottom plates and a pair of side plates arranged along a longitudinal axis of the magazine, and front and back plates arranged across said longitudinal axis;
 (b) a film passage opening formed in said top plate close to said front plate;
 (c) a supporting plate in said magazine in the area of said opening and defining with said bottom plate, said side plates, and said back plate a sheet film containing space within said magazine casing;
 (d) a plurality of engaging elements provided on the wall surface of said supporting plate facing one of the edges of the sheet films contained so as to allow said engaging elements to engage said film edge; and
 (e) a wide depression formed along the longitudinal axis of said magazine on the inner surface of said top plate to said opening facing the sheet films contained in said magazine, said depression minimizing engagement between the sheet films and said top plate when said magazine is in said upside-down horizontal position.

9. A film containing magazine according to claim 8, in which said engaging elements are directed toward said bottom plate and are inclined with respect to the wall surface of said supporting plate.

10. A film containing magazine according to claim 8, wherein spaces are provided respectively between both ends of said supporting plate and the corresponding side plates and between said supporting plate and front plate and are used for taking out the sheet films contained from the magazine.

11. A film containing magazine according to claim 8, in which said supporting plate is fixed to said bottom plate.

12. A film containing magazine according to claim 8, in which said magazine further comprises supporting plates mounted to the inner wall surfaces of said side plates; engaging elements projecting from the wall surface of said supporting plate facing the side edges of the sheet films contained.

* * * * *